United States Patent
Coleman et al.

(10) Patent No.: US 7,958,709 B2
(45) Date of Patent: Jun. 14, 2011

(54) HEIGHT ADJUSTMENT MECHANISMS FOR GRASS TREATMENT DEVICES

(75) Inventors: John Coleman, Sheffield (GB); Tom Slater, Sheffield (GB)

(73) Assignee: Advanced Engineering Techniques Limited, Sheffield (GB)

( * ) Notice: Subject to any disclaimer, the term of this patent is extended or adjusted under 35 U.S.C. 154(b) by 99 days.

(21) Appl. No.: 12/518,036

(22) PCT Filed: Dec. 7, 2007

(86) PCT No.: PCT/GB2007/004675
§ 371 (c)(1),
(2), (4) Date: Jun. 5, 2009

(87) PCT Pub. No.: WO2008/068494
PCT Pub. Date: Jun. 12, 2008

(65) Prior Publication Data
US 2010/0313538 A1   Dec. 16, 2010

(30) Foreign Application Priority Data

Dec. 8, 2006 (GB) .................................. 0624547.6
Jul. 19, 2007 (GB) .................................. 0714095.7

(51) Int. Cl.
*A01D 34/00* (2006.01)
(52) U.S. Cl. ........................................................ 56/17.2
(58) Field of Classification Search ............... 56/2, 6, 56/7, 11.1, 12.6, 249, 294, 16.7, 16.9, 17.1, 56/17.2, 249.5, 320.1, 320.2; 280/43.13, 280/43.17, 86, 89, 47.11, 79.11; 404/117, 404/128
See application file for complete search history.

(56) References Cited

U.S. PATENT DOCUMENTS

| | | | | |
|---|---|---|---|---|
| 5,241,810 A | * | 9/1993 | Reichen | 56/249 |
| 6,651,415 B2 | * | 11/2003 | Burke | 56/17.2 |

(Continued)

FOREIGN PATENT DOCUMENTS

| FR | 1 490 422 | 6/1967 |
|---|---|---|
| FR | 2814323 A1 | 9/2000 |

(Continued)

OTHER PUBLICATIONS

Written Opinion of the International Searching Authority, WIPO, PCT/GB2007/004675, Mar. 14, 2008.

(Continued)

*Primary Examiner* — Robert E Pezzuto
(74) *Attorney, Agent, or Firm* — Meschkow & Gresham, P.L.C.

(57) ABSTRACT

A grass treatment device height adjustment assembly for adjusting the height of a grass treatment tool above ground level includes a height adjustment mechanism and an elongate rotational element, such as a roller, having first and second ends. The rotational element has an axle extending substantially along the longitudinal axis of the element about which the element rotates. The height adjustment mechanism includes a rotatable member connected to the axle of the rotational element wherein the rotatable member is associated with a second fixed axis of rotation that is substantially parallel to but offset relative to the first rotational axis. The second axis of rotation enables the height adjustment mechanism to adjust the position of the first axis of rotation relative to the second axis of rotation.

20 Claims, 4 Drawing Sheets

U.S. PATENT DOCUMENTS

| | | | | |
|---|---|---|---|---|
| D499,434 S | * | 12/2004 | Anderson | D15/17 |
| 7,395,648 B1 | * | 7/2008 | Silbernagel et al. | 56/17.2 |
| 7,624,560 B1 | * | 12/2009 | Humphrey | 56/17.2 |
| 7,661,257 B2 | * | 2/2010 | Slater et al. | 56/249.5 |

FOREIGN PATENT DOCUMENTS

| | | |
|---|---|---|
| GB | 160727 | 3/1921 |
| GB | 878588 A | 10/1961 |
| GB | 2147185 A | 5/1985 |

OTHER PUBLICATIONS

International Search Report, WIPO, PCT/GB2007/004675, Mar. 14, 2008.

International Preliminary Report on Patentability, WIPO, PCT/GB2007/004675, Apr. 23, 2009.

Combined Search and Examination Report under Sections 17 & 18(3), UK application No. GB 0714095.7, Dec. 3, 2007.

* cited by examiner

HEIGHT ADJUSTMENT MECHANISMS FOR GRASS TREATMENT DEVICES

FIELD OF THE INVENTION

The present invention relates to improvements to height adjustment mechanisms for grass treatment devices. In particular, but not exclusively, the invention relates to the provision of an eccentric roller axle configured to adjust the height of a grass treatment tool positioned between first and a second ground contacting rollers.

BACKGROUND TO THE INVENTION

Grass treatment machines are used for treating grass surfaces such as lawns, golf courses, playing fields and parkland. Various types of grass treatment machines exist and include, but are not limited to, mowers, rollers, scarifiers and spikers. As is known to those skilled in the art typically such machines include one or more grass treatment devices or heads, each device comprising one or a plurality of grass treatment tools or elements. For many prior art grass treatment machines, such as, for example, those manufactured by John Deere, Toro, or Jacobsen, a plurality of grass treatment devices (typically two or three) are mounted on a given machine. A common configuration of three such grass treatment devices is such that they are mounted in a reverse echelon disposition: two grass treatment devices are mounted at the front of the machine with the third being mounted substantially immediately behind the first two.

Those skilled in the art will understand that in recent years improved varieties of grass have been bred for use as sports surfaces. In particular improved varieties of grass have been specifically bred for use on fairways and/or putting greens of golf courses and it is known that these grasses have become increasingly dense growing in comparison to earlier forms of grass. In relation to the improved grasses, generally known as ultra dense dwarf grasses, this means that the number of grass shoots per unit area is greater than with previous types of grass. Ultra dense dwarf grasses allow the grass to be cut to very low heights, which in turn allows greens and fairways to be faster, as regards the speed of travel of a golf ball disposed thereon, than has ever been previously possible. Examples of these new high-density grasses include cultivars of Bermuda Grass and Creeping Bent. As will be understood by those skilled in the art the aforementioned advanced grass surfaces require evermore increasing accuracy and care in their treatment and in particular in their being cut.

It is often necessary to adjust the height of a grass cutter or other treatment device on an ad hoc basis, as localised conditions require. This is because a grass or turf surface may be uneven or contoured. A common problem that may arise is that due to the use of an improperly adjusted grass cutter element. By improperly adjusted it is meant herein that either the cutter is set too high or too low for cropping of a given grass surface. A particularly undesirable is where the grass is cut too low resulting in so-called 'scalping' of the grassed surface. In relation to grassed surfaces for use in the sport of golf this means the removal of the entirety of the grass from an area. This frequently results in serious problems for golf players wishing to use the surface and generally renders the surface unusable. Less drastically, problems resulting from uneven cutting or treatment can also make a surface unplayable as such uneven treatment can make surfaces unpredictable and therefore undesirable to play upon.

As is known to those skilled in the art grass treatment devices typically comprise a number of rotational elements. Known prior art devices typically comprise front and rear rolling elements or rollers and positioned there-between are one or more grass treatment elements (or tools) of one kind or another. Commonly the treatment tool or tools provided include a grass cutting tool and/or a grooming tool, a grooming tool being a tool to lift the blades of grass into a substantially vertical direction ready for cutting. However another commonly employed tool is a grass treatment brush provided to attempt to remove debris from the densely packed grass. The height of the treatment tools require careful adjustment so as to accurately set their operating height above ground level. Prior art adjustment mechanisms operate in part by adjusting the distance between the first and/or second roller and the grass treatment tool. A disadvantage of such a mechanism is that in general adjustments need to be made to both sides of one or both rollers so as to provide an even adjustment to the overall device and ensure a uniform cut height of the grass.

As indicated above it is necessary to adjust the height of the grass treatment tool associated with the grass treatment device on an ad hoc basis, as it may be necessary both to make a number of different height cuts on different portions of a single surface or more normally different portions of an overall venue. Further problems associated with the necessity to make such adjustments using the prior art mechanism are that requiring two separate adjustments to be made at either side of the roller means that an unskilled or unobservant operator of such a prior art grass treatment device can inadvertently set the relative height on both sides of the adjustment mechanism to different levels and thereby cause uneven grass treatment levels. For instance if grass cut height varies along the length of the grass treatment tool then the effect will spread over the entirety of a grass surface that is being treated. Such differential treatment regimes can have serious implications as to the viability and properties of any grass surface so mistreated.

In view of the above there is a need to provide an improved height adjustment mechanism for grass treatment devices such that treatment elements (including, for example, cutters, groomers and brushes) are more accurately and reliably set before and during use of a given grass treatment apparatus.

SUMMARY OF THE INVENTION

An object of the present invention is to provide an improved mechanism for adjusting the height at which a grass treatment element of a grass treatment device is configured to take effect. In order to achieve this it is an object of the invention to provide for adjustment of a first rotational element (preferably a roller) of a grass treatment device relative to a second rotational element (preferably a second roller).

A further object of the present invention is to provide a height adjustment mechanism for a grass treatment device that is operated from a single point associated with a rotational element rather than from a plurality of points. In particular it is an object of the present invention to enable the position of a given roller element to be adjusted using a mechanism that is located only on a single end of the roller element rather than at both ends.

Yet a further object of the present invention is to provide a means of adjusting the operating height of a grass treatment element that is readily usable by operators having little experience of using height adjusters associated with grass treatment devices.

According to a first aspect of the present invention there is provided a height adjustment assembly for adjusting the height of a grass treatment tool of a grass treatment device, said assembly comprising:

a roller, connectable at a first end to said grass treatment device and at a second end to a height adjustment mechanism; and a roller axis, formed through the center of said roller and extending in a longitudinal direction there through and about which said roller rotates;

said assembly characterized in that:

said height adjustment mechanism comprises a second rotational axis that is fixed relative to said roller axis, said second rotational axis and said roller axis being substantially parallel but offset to each other and said mechanism configured to displace said roller axis relative to said second axis to thereby provide a height adjustment of a grass treatment tool.

Preferably said adjustment mechanism further comprises a worm gear arranged in a substantially perpendicular orientation to said second axis, said worm gear operably connected to a worm gear wheel formed in an axis substantially parallel to said adjustment axis and connected to said adjustment mechanism via a timing belt.

Preferably said height adjustment mechanism further comprises a tensioning wheel positioned between said worm gear wheel and said adjustment mechanism and operably connected to said timing belt so as to tension said belt.

Preferably said height adjustment mechanism further comprises a threaded shaft arranged in a substantially perpendicular orientation relative to said second axis and configured to interact with said adjustment mechanism so as to translate rotational movement of said threaded shaft into a perpendicularly opposed rotation of said adjustment mechanism.

Preferably said adjustment mechanism comprises a disengageable locking means configured to prevent the rotation of said adjustment mechanism and means to disengage said locking mechanism and rotate said adjustment mechanism.

Suitably said height adjustment mechanism further comprises a knob configured to operate said adjustment mechanism.

Preferably said height adjustment mechanism comprises means to adjust said height adjustment mechanism in predetermined quantities so as to allow the required height adjustment to be made in predetermined increments.

Preferably said mechanism further comprises a series of indentations and bumps formed into said height adjustment mechanism and configured to interact with each other, wherein said indentations and bumps are formed in predetermined quanititised intervals to thereby allow the height adjustment mechanism to be adjusted and set in such quanititised intervals.

Preferably said roller is configured to move inwards towards the other componentry of said grass treatment device when adjusted in an upwards direction.

Suitably said grass treatment device further comprises a second roller and positioned between said second roller and said first roller a grass treatment tool.

Preferably said grass treatment device further comprises a housing configured to contain and protect the components of said height adjustment mechanism.

Preferably said roller comprises a rear roller of a grass treatment device.

According to a second aspect of the present invention there is provided a grass treatment device height adjustment assembly for adjusting the height of a grass treatment tool above ground level, said assembly comprising:

a height adjustment mechanism; and an elongate rotational element, such as a roller, having first and second ends, said rotational element comprising an axle extending substantially along the longitudinal axis of said element about which said element rotates;

said assembly characterized in that:

said height adjustment mechanism comprises a rotatable member connected to said axle of said rotational element wherein said rotatable member is associated with a second fixed axis of rotation that is substantially parallel to but offset relative to said first rotational axis, said second axis of rotation thereby configured to enable said height adjustment mechanism to adjust the position of said first axis of rotation relative to said second axis of rotation.

Preferably said height adjustment assembly is configured to be used to adjust the height of a rotational grass treatment tool.

Preferably said height adjustment mechanism comprises a worm gear assembly.

Preferably said worm gear assembly comprises a worm gear and a worm gear wheel that are configured to effect rotation of said second axis which in turn effects the position of said first rotational axis relative to said second rotational axis.

Preferably said rotation of said second axis is affected by said worm gear wheel via a timing belt.

Preferably said height adjustment mechanism further comprises a tensioning wheel positioned to tension said belt.

According to a third aspect of the present invention there is provided a grass treatment device comprising:

a height adjustment mechanism; and an elongate rotatable element, such as a roller, having first and second ends, said rotatable element operably connected at a first point to said device and at a second point to said height adjustment mechanism, said rotatable element comprising a first axle defining a first axis of rotation that substantially extends through the center of said rotatable element in a longitudinal direction and about which said rotatable element rotates;

said device characterised in that said height adjustment mechanism comprises a rotatable member connected to said first axle, said rotatable member associated with a second axis of rotation that is substantially parallel to and offset relative to said roller axle, said second axis of rotation thereby configured to enable said height adjustment mechanism to adjust the position of said roller axle relative to said second axis of rotation.

According to a fourth aspect of the present invention there is provided a height adjustment mechanism for use on a single side of a rotational element of a grass treatment device wherein said mechanism comprises a geared rotational axle configured to connect with said rotational element, said rotational element having an axis of rotation that is substantially parallel to but offset from that of said geared axle.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

The inventors of the present invention, seeing the disadvantages associated with prior art height adjustment mechanisms, have arrived at an improved height adjustment mechanism that allows, via a single adjustment, the adjustment of the height of a grass tool relative to a grass surface. This is facilitated via the use of an easily understood indication system that minimizes the risk of operator-mediated malfunctions. In addition the inventors also provide a number of other improvements to height adjustment mechanisms and a means of modifying an existing grass treatment device using their improved height adjustment mechanism.

Figure 1:
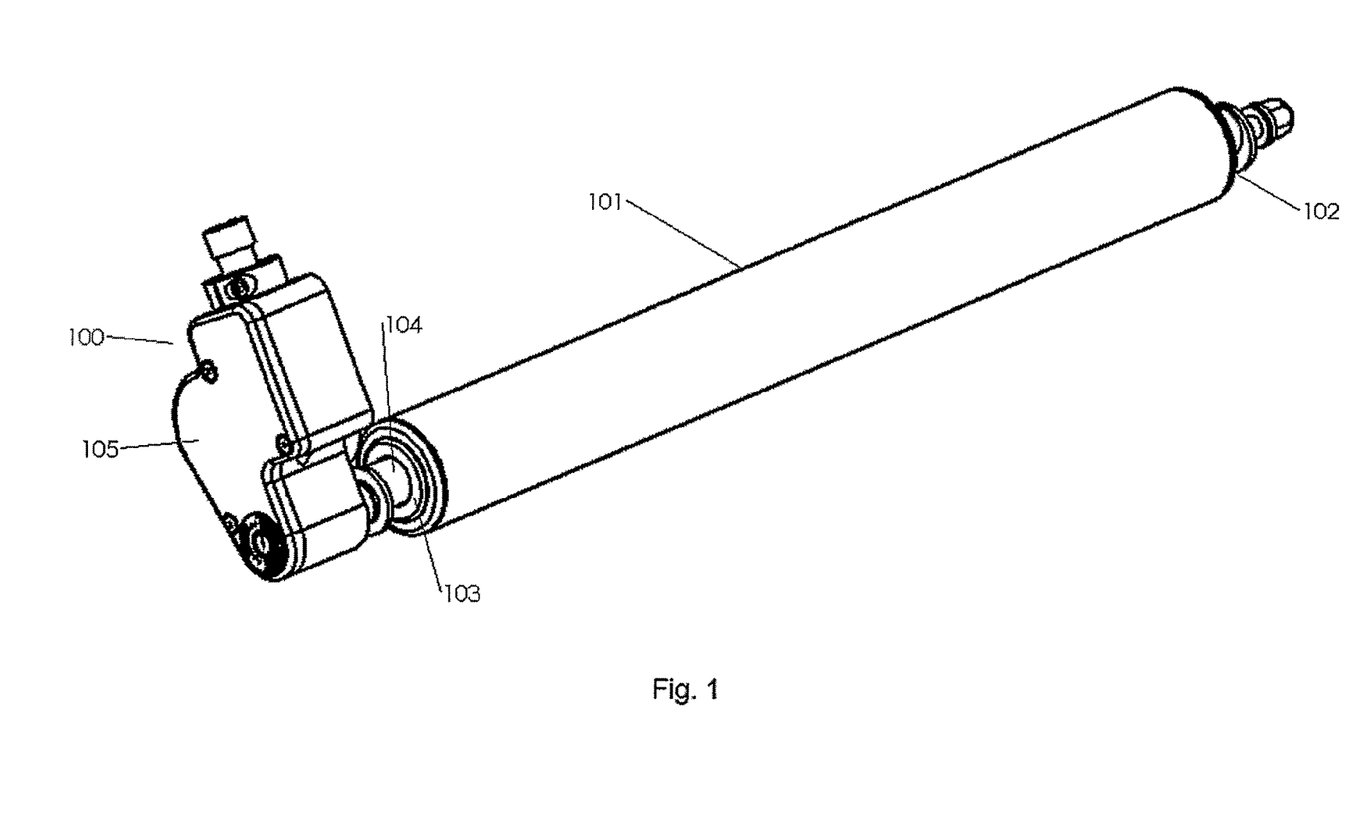
With reference to FIG. 1 herein there is shown, in perspective view, a first preferred embodiment of the present invention comprising a height adjustment mechanism for use with a grass treatment device, the adjuster mechanism components being located within a housing.

With reference to FIG. 1 enclosed herein, the inventors provide a new type of height adjustment mechanism. In accordance with this new height adjustment mechanism there is provided an eccentric roller axle positioned in the second or rear roller of a grass treatment device. By adjusting the position of this eccentric roller axle, this causes the rear axle to raise or lower with respect to a surface upon which it is replaced and used.

In order to change the orientation of the eccentric roller axle, there is further provided an adjuster knob operably connected to a worm gear which itself is operably connected to a worm gear wheel and via a timing belt to the eccentric roller axle. Therefore by turning the adjuster knob this causes the worm gear to revolve causing the worm gear wheel to move and the timing belt to move which itself causes the position of the eccentric axle to be adjusted. Using this type of adjustment mechanism, it is possible to relatively easily adjust the position of the eccentric roller axle and so the height of grass tool which is dependent upon the rear roller at least in part for its positioning upon the grass surface which is being treated.

In accordance with the specific embodiment of the present invention, the adjustment mechanism is configured such that one turn of the adjustment knob is equivalent to a one mm height adjustment of the device. In accordance with a further aspect of this specific embodiment of the present invention, the roller moves inwards towards the grass treatment device as the height of the unit goes up.

In an alternate mode of operation, it would also be possible to use a long shaft and/or a finely pitched threaded shaft to achieve the same adjustment of the eccentric roller axle, although the inventors consider this to be not as good a solution as the use of a worm gear wheel system.

With reference to FIG. 1 herein there is shown schematically in perspective view a height adjustment mechanism (HAM) 100 as configured in accordance with a first preferred embodiment of the present invention. In FIG. 1 HAM 100 is shown connected to a rear roller 101 of a grass treatment device, the remainder of the device not being shown. Collectively HAM 100 and roller 101 represent a height adjustment assembly for a grass treatment device such as a lawn mower. Rear roller 101 substantially comprises a cylindrical body and is configured to form part of an overall larger grass treatment device comprising a corresponding front roller suitably spaced apart from rear roller 101. Typically between the front and rear rollers there is provided a grass treatment tool that is suitable to perform the necessary operation upon the grass surface which the grass treatment device is to treat. In some cases there may be more than one grass treatment tool and in particular there may be provided a cutting tool or element and/or a grooming tool or element. Rear roller 101 may be made of a variety of suitable materials and must be of a suitable dimension to allow the transmission of weight of the overall grass treatment device to be distributed over the immediate grass surface located underneath and/or near to the treatment device without causing damage to this grass surface.

Roller 101 further comprises a longitudinally displaced rotation axle that is not illustrated in FIG. 1 apart from at either end of the rear roller 101 where hub members 102 and 103 project from rear roller 101. Hub members 102 and 103 are configured to connect with a grass treatment device of which rear roller 101 is to form a component part. Hub members 102 and 103 allow rear roller 101 to rotate about its longitudinal axis and so allow the passage of the grass treatment device across a grass surface via rotation of the rollers.

In accordance with the preferred embodiment of the present invention of FIG. 1, the rotational axle comprising first and second hub members 102, 103 is connected to HAM 100 eccentrically. In this respect the rotational axle may also be referred to as an "eccentric axle" (indicated at 104 in FIG. 1) when viewed relative to its mechanical communication with HAM 100. Eccentric axle 104 is operably connected to height adjustment mechanism 100 having a housing 105 configured to protect the working mechanisms of the adjuster from damage due to contamination with dirt or other environmental hazards.

Positioned upon an upper surface of housing 105 is an adjuster knob 106. Turning adjuster knob 106 causes the operation of the adjustment mechanism which is contained in housing 105 and leads to a change in orientation, that is spatial position of rear roller 101 with respect to the fixed eccentric axle 104. By "fixed" it is meant herein that when assembly 100/101 is in use on a grass treatment device axle 104 is fixed in terms of its positional relationship with respect to the grass treatment device to which the assembly is fitted.

In accordance with this first specific embodiment of the present invention, the adjuster housing 105 is operably connected to the frame of a grass treatment device that is itself connected to both the first roller and the grass treatment tool. Therefore by adjusting the orientation of the eccentric axle 104 via the adjustment knob 106 and its associated adjustment mechanism this leads to an overall adjustment in the relative orientation of the rear roller 101 and thus of the overall grass treatment device. For clarity, the grass treatment device is not shown since features relating to such a device are known in the prior art.

Figure 2:
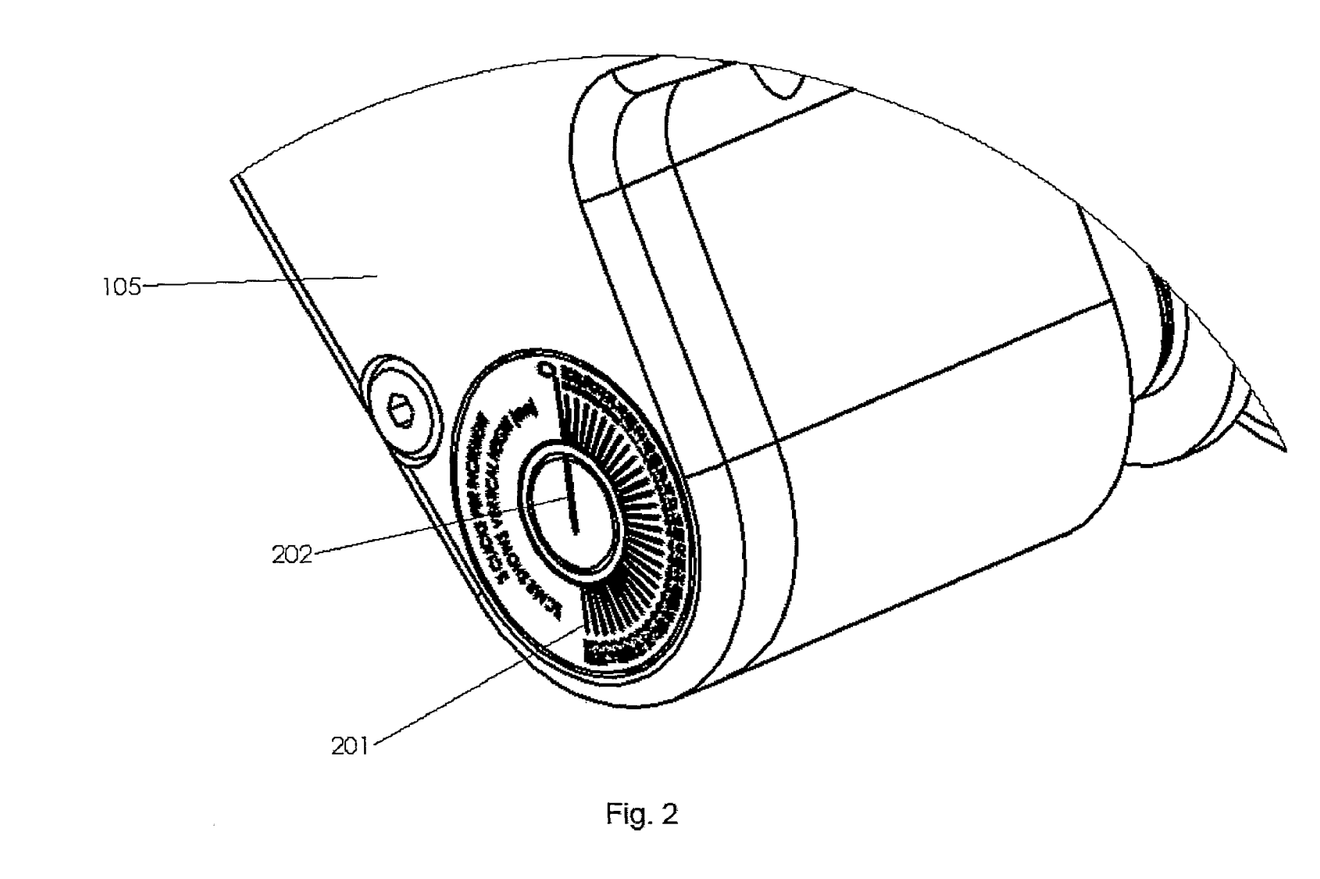
With reference to FIG. 2 herein there is shown an enlarged perspective view of a portion of the adjuster housing of FIG. 1 and in particular there is schematically illustrated an adjuster gauge and an adjuster position marker.

With reference to FIGS. 1 and 2 there is also shown on an outer face of adjuster housing 105 an adjustment gauge 201. Adjuster gauge 201 is substantially circular in nature and comprises a graduated scale. The adjuster gauge 201 also comprises an adjuster position marker 202. Adjuster position marker 202 is operably connected to the eccentrically mounted axle 104 of rear roller 101 and when the eccentric axle of the rear roller is adjusted, the adjuster position marker moves accordingly. Thus comparing the position of the adjuster position marker 202 relative to the adjuster gauge 201 an operator of the device can accurately and quickly identify the current position of the eccentric axle and make such adjustments as may be necessary to operate the associated grass treatment device in the optimum configuration for a given grass surface that is to be treated.

With reference to FIG. 2 herein, there is shown an enlarged view of a lower portion of housing 105. There is also shown the adjuster gauge 201 and the adjuster position marker 202 in an enlarged view. As indicated previously, the position of the adjuster position marker 202 is dependent upon the relative orientation of the eccentrically mounted axle of the rear roller, and this itself is determined by movement of the adjuster knob 106 positioned on an upper portion of adjuster housing 105.

In accordance with a further preferred embodiment of the present invention, the invention may be configured so as to further increase the accuracy of the adjustment mechanism by introducing a quantitised step mechanism into the adjuster knob assembly. Such a quantitised mechanism suitably comprises means to allow the knob to be turned in pre-determined steps corresponding to a previously defined level of adjustment required to be provided to eccentric axle 104. In accordance with a preferred embodiment of the present invention, such a mechanism involves one pre-determined movement of the adjuster mechanism corresponding to a 0.1 mm increase or decrease in height of the grass treatment device mediated by movement of eccentric axle 104. In such an instance adjuster gauge 201 comprises adjustment increments corresponding to radial marks, each said mark corresponding to a 0.1-mm adjustment in terms of the height that a grass cutting tool of a grass treatment device is to be raised or lowered with respect to ground level. In a preferred embodiment of the present invention knob 106 allows an operator to effect the worm gear assembly such that a large amount of rotation of knob 106 translates into a small amount of height adjustment, thus enabling very accurate height adjustments to be made.

Alternatively, any other quantity of distance could be used as a pre-determined height adjustment step and a range of different pre-determined adjustment distances could be incorporated into this system depending upon the specific apparatus in which this adjustment mechanism is incorporated and the specific geometry of its component parts and also depending on the specific grass treatment tool which is being used in a given grass treatment device.

In accordance with a further preferred embodiment of the present invention, instead of having a separate adjuster mechanism configured to move the eccentric axle 104 of the rear roller, the inventors also consider it possible to combine the adjuster gauge mechanism and the adjustment mechanism by using various other forms of height adjustment mechanisms. In accordance with such an alternative embodiment of the present invention, such a mechanism would allow the adjustment of the eccentric axis by first depressing a portion of the adjustment gauge, for instance using a screw driver or other suitable means such as an Allen key. This would disengage a locking (or breaking) mechanism that holds the eccentric axle in its position. Following the disengagement of the breaking mechanism associated with the eccentric axle, the eccentric axle could be adjusted accordingly depending on a given operator's specific requirements.

Figure 3:
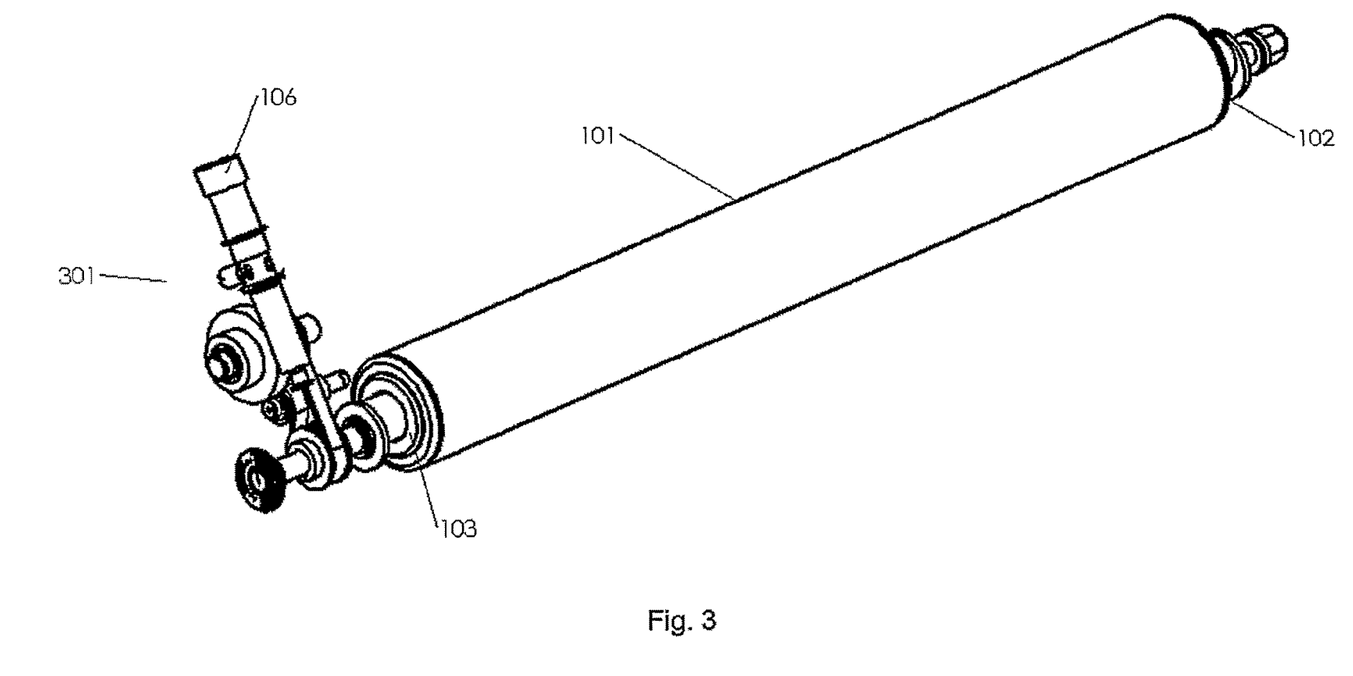
With reference to FIG. 3 herein there is shown in perspective view the adjustment mechanism of FIG. 1 with the housing removed.

With reference to FIG. 3 herein there is shown in perspective view the height adjustment mechanism 301 of FIG. 1 with the housing removed.

Figure 4:
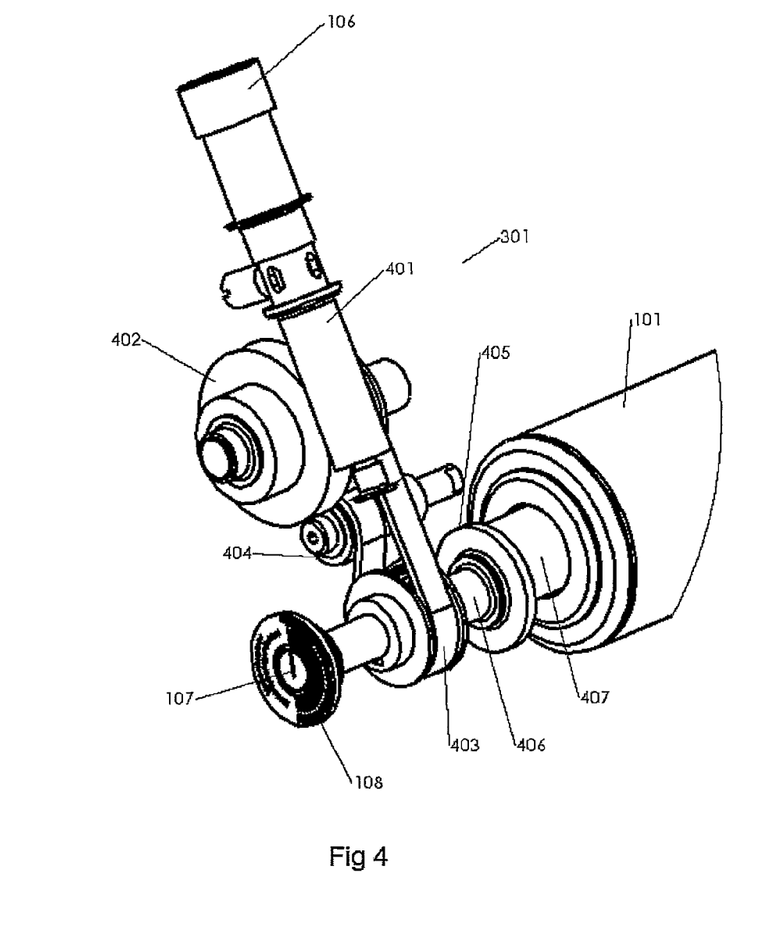
With reference to FIG. 4 herein there is shown an enlarged perspective view of the exposed adjustment mechanism illustrated in FIG. 3.

With reference to FIG. 4 herein there is shown an enlarged more detailed perspective view of the exposed adjustment mechanism 301 illustrated in FIG. 3.

Adjuster knob 106 is, in accordance with the best mode contemplated of configuring the present invention, operably connected to a worm gear assembly. The worm gear assembly comprises worm gear 401 that is positioned upon an identical axis to adjuster knob 106 and is operably connected thereto.

Worm gear 401 is connected to a worm gear wheel 402. Worm gear wheel 402 is positioned such that its axis of rotation is substantially perpendicular to the axis of rotation of adjuster knob 106 and its associated worm gear 401. An outer portion of worm gear wheel 402 is in physical contact with the worm gear 401. By rotating the adjuster knob and its associated worm gear 401, this rotation in a first orientation is translated into rotation of the worm gear wheel 402 via its interaction with the worm gear 401 into rotation in a second orientation.

Associated with worm gear wheel 402 is a gripping member about which is positioned a timing belt 403. This timing belt 403 is tensioned by a tensioning wheel 404 and at a second end the timing belt 403 is connected to a second gripping means which is operably connected to the eccentric roller axle 104 at a first end and to the adjuster position marker 202 at a second end. As described previously the adjuster position marker 108 is surrounded by an adjuster gauge 107. This adjuster gauge comprises a number of graduations. By comparing the position of the adjuster position marker 108 to adjuster gauge 107 a user may determine the adjustments which have been made to the rear roller 101 previously using the adjustment mechanism.

In accordance with a further embodiment of the present invention, the adjuster knob 106 further comprises means to allow it to be turned in pre-determined quantified steps. This mechanism comprises a number of indentations made into a lower portion of the adjuster knob 106. These indentations are evenly spaced around the circumference of the adjuster knob 106 in the adjuster housing that is not shown in FIG. 3 or 4. There are provided a number of corresponding protrusions corresponding to the indentations formed in the worm gear mechanism. These protrusions are configured to interact with the indentations and lock the adjuster knob into a position wherein one or more of the protrusions are located in corresponding indentations. In this way adjuster knob 106 may therefore be moved a predetermined distance around its axis of rotation and as previously discussed this angle of rotation can be calculated so as to correspond to a specific and predetermined adjustment of the eccentric axle 104 of the rear roller 101 and by implication a height adjustment mechanism between the rear roller and the associated grass treatment device.

In accordance with an alternate embodiment of the present invention, the adjustment mechanism as previously described, instead of comprising a worm gear, worm wheel and timing belt mechanism may instead comprise an elongate shaft with a normal thread or alternatively a finely pitched threaded shaft operably connected to the eccentric roller axle of a rear roller. The operable connection could be a normal gear mechanism configured to translate the direction of rotation of such a shaft from a first direction to a second direction, most normally these directions being substantially perpendicular to each other and corresponding to in a first axis the rotation of the shaft and in a second axis the axis of rotation for the eccentric axle.

With reference to FIG. 4 herein, it can be seen that the rear roller 101 comprises a central axle running along the longitudinal axis of the cylindrical body from which the rear roller is comprised. Connected at an end of this central axle is height adjustment mechanism 301 which in accordance with this specific embodiment of the present invention comprises a substantially cylindrical shaft in the approximate centre of which is positioned the gripping member and at a first end of which it is connected to the central axle of the rear roller, and at a second end of which there is provided adjustment position marker 108 and adjuster gauge 107. At the point of connection between the adjustment mechanism and the central axle of the roller, the axis which runs through the centre of this roller axle and the eccentric axis which runs through the longitudinal centre of the adjustment mechanism are substantially parallel to each other but are offset relative to each other in space.

This is achieved in accordance with this specific embodiment of the present invention by providing a disc of material which is connected to the potential axle of the roller mechanism in an offset orientation and which is connected to the central axis of the adjustment mechanism in a central orientation. This causes adjustment of the adjustment mechanism via its interaction with other components of the adjustment mechanism in particular the worm gear worm gear wheel and timing belt to cause rotation of this disc (thereby a rotatable member), which is operably connected to both the adjustment mechanism and the roller central axis.

Although the rotation of this disc does not affect the relative orientation of the adjustment mechanism to the overall grass treatment device, it does affect the orientation of the rear roller via its interaction with the central roller axle as this axle is offset relative to the centre of this axle. Therefore, by adjusting the adjustment axis formed through the adjustment mechanism via the components of the adjustment mechanism as previously described, this can lead to adjustment of the central axle of the roller and the roller itself relative to a grass surface upon which the roller is positioned when in use.

Referring to FIG. 4 it can be seen that height adjustment mechanism 301 is operable connected to rear roller 101 via connection plate 405. Connection plate 405 is substantially a disk like member that is rotatably connected to the height adjustment axle 406. Plate 405 is mounted centrally with respect to axle 406. However the axle 407 of rear roller 101 is mounted eccentrically to plate 405 such that axles 406 and 407 are thereby substantially parallel, but offset, to each other.

In accordance with a further aspect of the present invention, the inventors also consider it useful to provide a further means of adjustment. In particular, the inventors consider it useful when the adjustment mechanism is being adjusted so as to lower a grass treatment tool associated with the grass treatment device into a lower position relative to the grass surface upon which the treatment tool is acting, that the second roller moves inwards towards this grass treatment tool and the forward or second roller associated with the grass treatment device. By drawing the second roller into a closer spatial relationship with the other components of the tool this decreases the footprint of the device and therefore allows the grass treatment tool to more closely adhere to the localised surface conditions in the place where it is acting. This is important as although generally speaking surface orientation is relatively constant, the closer or lower the grass treatment tool is to a grass surface, the more important it is that this tool does not inadvertently act upon the surface directly as this can lead to so called scalping of the grass surface.

In accordance with further aspects of the present invention, the components of this height adjustment mechanism may be provided in the form of a kit of parts which may be fitted to an existing grass treatment device so as to effect the novel height adjustment mechanism described herein. In addition to the specific components previously described and the various mechanisms in which the height adjustment mechanism can be implemented using this eccentric axle arrangement, there would also need to be provided suitable means to connect the axle of the height adjustment mechanism to that of the rear roller of such a prior art grass treatment device. Such attachment means could include many prior art mechanisms for instance bushels, holding bolts and many other mechanisms which do not form a part of the present invention other than as means of implementing the specific height adjustment mechanism of the present invention as a means of adjusting and modifying an existing prior art grass adjustment mechanism.

FIGS. 1-4 schematically illustrate the best mode contemplated in relation to implementing the present invention. In more general terms the invention may be defined as a grass treatment device height adjustment assembly for adjusting the height of a grass treatment tool above ground level, said assembly comprising:

a height adjustment mechanism; and an elongate rotational element, such as a roller, having first and second ends, said rotational element comprising an axle extending substantially along the longitudinal axis of said element about which said element rotates;

wherein:

said height adjustment mechanism comprises a rotatable member connected to said axle of said rotational element wherein said rotatable member is associated with a second fixed axis of rotation that is substantially parallel to but offset relative to said first rotational axis, said second axis of rotation thereby configured to enable said height adjustment mechanism to adjust the position of said first axis of rotation relative to said second axis of rotation.

Although the invention has been described herein with reference to a rear roller of a grass treatment device it is to be understood by those skilled in the art that it may equally be used in relation to a front roller or another element of such a device.

In the best mode contemplated the invention is used to adjust the height of a rotational grass treatment tool. However those skilled in the art will appreciate that it may also be used with non-rotational tools such as translation tools of one type or another.

The invention claimed is:

1. A height adjustment assembly for adjusting the height of a grass treatment tool of a grass treatment device above ground level, said assembly comprising:

a height adjustment mechanism; and an elongate rotational element having first and second ends, said rotational element comprising an axle extending substantially along the longitudinal axis of said element about which said element rotates;

said assembly characterized in that said height adjustment mechanism comprises:

a rotatable member connected to said axle of said rotational element wherein said rotatable member is associated with a second fixed axis of rotation that is substantially parallel to and offset relative to said first rotational axis; and a worm gear assembly, said second axis of rotation and said worm gear assembly thereby configured to enable said height adjustment mechanism to adjust the position of said first axis of rotation relative to said second axis of rotation.

2. A height adjustment assembly as claimed in claim claim 1 wherein said worm gear assembly comprises a worm gear and a worm gear wheel that are configured to effect rotation of said second axis which in turn effects the position of said first rotational axis relative to said second rotational axis.

3. A height adjustment assembly as claimed in claim 1 wherein said worm gear assembly comprises a worm gear and a worm gear wheel that are configured to effect rotation of said second axis which in turn effects the position of said first rotational axis relative to said second rotational axis and wherein said rotation of said second axis is affected by said worm gear wheel via a timing belt.

4. A height adjustment assembly as claimed in claim 1, wherein said worm gear assembly comprises a worm gear and a worm gear wheel that are configured to effect rotation of said second axis which in turn effects the position of said first rotational axis relative to said second rotational axis and wherein said height adjustment mechanism further comprises a tensioning wheel positioned to tension said belt.

5. A height adjustment assembly as claimed in claim 1, wherein said worm gear assembly comprises a worm gear arranged in a substantially perpendicular orientation to said second axis of rotation, said worm gear operably connected to a worm gear wheel formed in an axis substantially parallel to said second axis of rotation.

6. A height adjustment assembly as claimed in claim 1, wherein said worm gear assembly comprises a worm gear arranged in a substantially perpendicular orientation to said second axis of rotation, said worm gear operably connected to a worm gear wheel formed in an axis substantially parallel to said second axis of rotation and wherein said height adjustment mechanism further comprises a tensioning wheel positioned between said worm gear wheel operably connected to said timing belt so as to tension said belt.

7. A height adjustment assembly as claimed in claim 1 wherein said height adjustment mechanism further comprises a threaded shaft arranged in a substantially perpendicular orientation relative to said second axis of rotation and configured to translate rotational movement of said threaded shaft into a perpendicularly opposed rotation of said height adjustment mechanism.

8. A height adjustment assembly as claimed in claim 1, wherein said height adjustment mechanism comprises a disengageable locking means configured to prevent the rotation of said height adjustment mechanism and means to disengage said locking mechanism and rotate said adjustment mechanism.

9. A height adjustment assembly for a grass treatment device as claimed in claim 1 wherein said height adjustment mechanism further comprises a knob configured to operate said height adjustment mechanism.

10. A height adjustment assembly as claimed in claim 1 wherein said height adjustment mechanism comprises means to adjust said height adjustment mechanism in predetermined quantities so as to allow a required height adjustment to be made in predetermined increment.

11. A height adjustment assembly for a grass treatment device as claimed in claim 1 wherein said height adjustment mechanism further comprises a series of indentations and bumps formed into said height adjustment mechanism and configured to interact with each other, wherein said indentations and bumps are formed in predetermined quanititised intervals to thereby allow the height adjustment mechanism to be adjusted and set in such quanititised intervals.

12. A height adjustment mechanism for a grass treatment device as claimed in claim 1, wherein said roller is configured to move inwards towards the other componentry of said grass treatment device when adjusted in an upwards direction.

13. A height adjustment assembly for a grass treatment device as claimed in claim 1 wherein said grass treatment device comprises first and second rollers and positioned between said second roller and said first roller a grass treatment tool.

14. A height adjustment assembly for a grass treatment device as claimed in claim 1 wherein said grass treatment device further comprises a housing configured to contain and protect the components of said height adjustment mechanism.

15. A height adjustment assembly as claimed in claim 1 wherein said elongate rotatable element comprises a rear roller of a grass treatment device.

16. A height adjustment assembly as claimed in claim 1 wherein said elongate rotational element comprises a roller.

17. A grass treatment device comprising:
a height adjustment mechanism; and
an elongate rotatable element having first and second ends, said rotatable element operably connected at a first point to said device and at a second point to said height adjustment mechanism, said rotatable element comprising a first axle defining a first axis of rotation that substantially extends through the center of said rotatable element in a longitudinal direction and about which said rotatable element rotates;
said device characterised in that said height adjustment mechanism comprises:
a rotatable member connected to said first axle, said rotatable member associated with a second axis of rotation that is substantially parallel to and offset relative to said roller axle; and
a worm gear assembly, said second axis of rotation and said worm gear assembly thereby configured to enable said height adjustment mechanism to adjust the position of said roller axle relative to said second axis of rotation.

18. A grass treatment device as claimed in claim 17 wherein said height adjustment mechanism comprises a worm gear and a worm gear wheel that are configured to effect rotation of said second axis which in turn effects the position of said first rotational axis relative to said second rotational axis.

19. A grass treatment device as claimed in claim 17 wherein said height adjustment mechanism comprises a worm gear and a worm gear wheel that are configured to effect rotation of said second axis which in turn effects the position of said first rotational axis relative to said second rotational axis and wherein said rotation of said second axis is affected by said worm gear wheel via a timing belt.

20. A grass treatment device as claimed in claim 17 wherein said elongate rotatable element comprises a roller.

* * * * *

UNITED STATES PATENT AND TRADEMARK OFFICE
CERTIFICATE OF CORRECTION

| | | |
|---|---|---|
| PATENT NO. | : 7,958,709 B2 | Page 1 of 1 |
| APPLICATION NO. | : 12/518036 | |
| DATED | : June 14, 2011 | |
| INVENTOR(S) | : John Coleman and Tom Slater | |

It is certified that error appears in the above-identified patent and that said Letters Patent is hereby corrected as shown below:

Col. 10, in Claim 2, First Line, DELETE "claim claim" and INSERT -- claim -- therefor.

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,958,709 B2 | Page 1 of 1 |
| APPLICATION NO. | : 12/518036 | |
| DATED | : June 14, 2011 | |
| INVENTOR(S) | : John Coleman and Tom Slater | |

It is certified that error appears in the above-identified patent and that said Letters Patent is hereby corrected as shown below:

Column 10, line 63 (Claim 2, line 1) DELETE "claim claim" and INSERT -- claim -- therefor.

This certificate supersedes the Certificate of Correction issued July 12, 2011.

Signed and Sealed this
Sixteenth Day of August, 2011

David J. Kappos
*Director of the United States Patent and Trademark Office*